(12) United States Patent
Uchida et al.

(10) Patent No.: US 7,947,140 B2
(45) Date of Patent: May 24, 2011

(54) STRIP MEMBER APPLICATION SYSTEM AND METHOD

(75) Inventors: Yo Uchida, Kokubunji (JP); Yasuo Mizota, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 999 days.

(21) Appl. No.: 11/665,801

(22) PCT Filed: Sep. 26, 2005

(86) PCT No.: PCT/JP2005/017624
§ 371 (c)(1),
(2), (4) Date: May 9, 2007

(87) PCT Pub. No.: WO2006/043395
PCT Pub. Date: Apr. 27, 2006

(65) Prior Publication Data
US 2008/0041514 A1 Feb. 21, 2008

(30) Foreign Application Priority Data
Oct. 21, 2004 (JP) .................................. 2004-306841

(51) Int. Cl.
*B29D 30/60* (2006.01)
(52) U.S. Cl. ......... 156/117; 156/130; 156/189; 156/397
(58) Field of Classification Search .................. 156/117, 156/130, 397, 186, 189, 425, 446, 448
See application file for complete search history.

(56) References Cited

U.S. PATENT DOCUMENTS

| RE25,349 | E | * | 3/1963 | Hanson | 156/130 |
|---|---|---|---|---|---|
| 3,843,482 | A | * | 10/1974 | Wireman et al. | 156/130 |
| 4,240,863 | A | | 12/1980 | Vinton | |
| 4,775,433 | A | | 10/1988 | Ishii | |
| 5,395,475 | A | | 3/1995 | Ozawa et al. | |
| 6,372,070 | B1 | * | 4/2002 | Iizuka et al. | 156/117 |
| 6,554,041 | B1 | | 4/2003 | Ohki et al. | |
| 6,955,734 | B2 | | 10/2005 | Ogawa | |
| 2003/0025238 | A1 | | 2/2003 | Ogawa | |

FOREIGN PATENT DOCUMENTS

| EP | 0 542 431 A1 | | 5/1993 |
|---|---|---|---|
| EP | 1 279 486 A2 | | 1/2003 |
| FR | 1 426 617 | | 4/1966 |
| GB | 1143562 A | * | 2/1969 |
| JP | Y2 6-21706 | | 6/1994 |
| JP | A 10-128869 | | 5/1998 |
| JP | A 2000-246812 | | 9/2000 |
| JP | A 2003-33960 | | 2/2003 |
| JP | A 2003-334867 | | 11/2003 |
| LU | 87 565 | | 10/1989 |

\* cited by examiner

*Primary Examiner* — Geoffrey L Knable
(74) *Attorney, Agent, or Firm* — Oliff & Berridge, PLC

(57) ABSTRACT

A strip member application system for feeding a ribbon-like rubber strip (4) through a clearance between application rollers forming a pair (11), and applying the rubber strip (4) onto a rotational member (2). A guide roller (7) to be wound by the rubber strip (4) is provided on the upstream side of the application roller pair (11), and defines a substantially U-shaped detour path extending downwards. A first and a second auxiliary rollers (6, 8) are arranged on the downstream side and the upstream side of the guide roller (7), respectively. The application roller pair (11) can be swung integrally with the guide roller (7) and the second auxiliary roller (8), within a horizontal plane and about a pivot that is spaced from the guide roller (7) toward the first auxiliary roller (6).

9 Claims, 5 Drawing Sheets

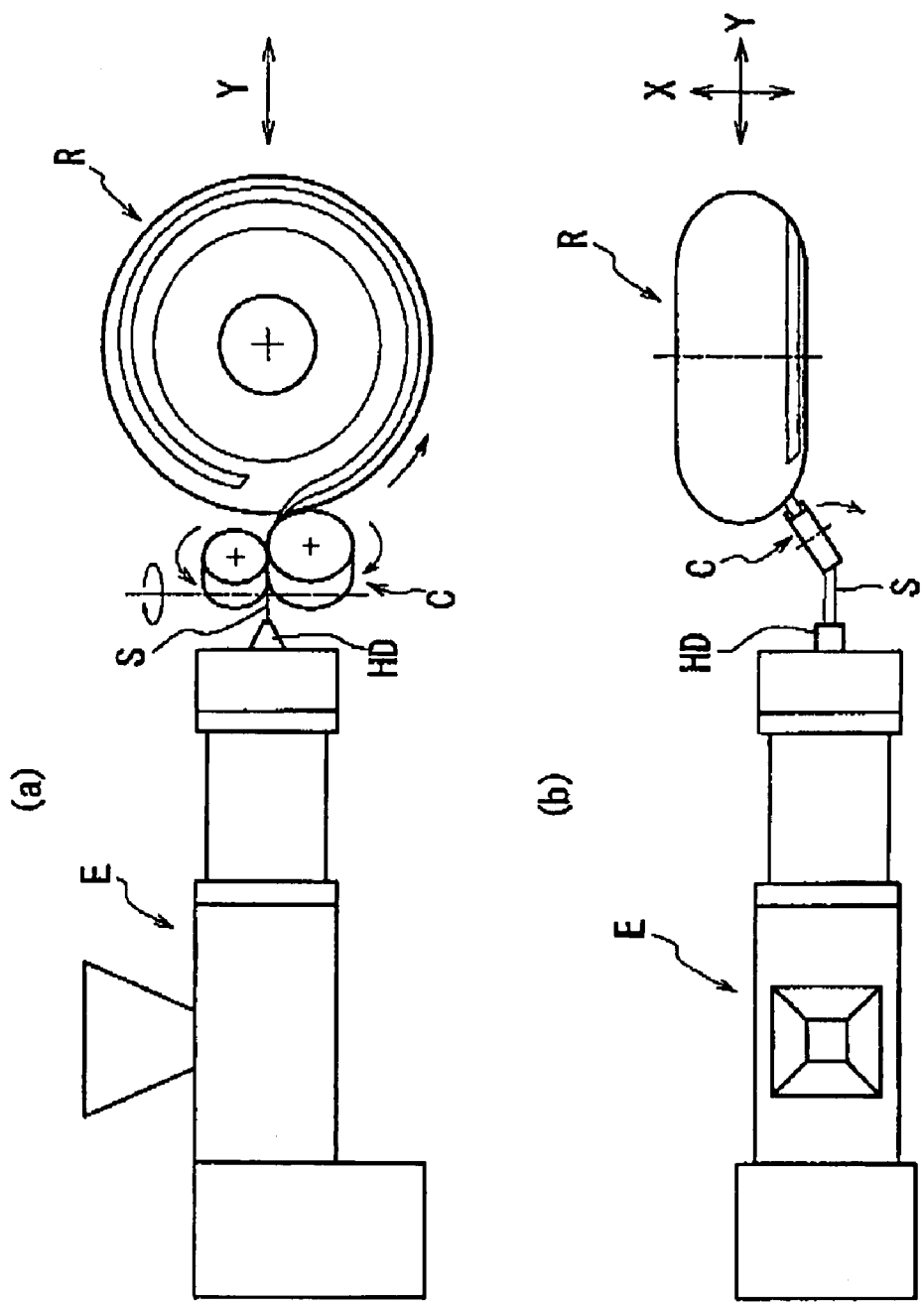

STRIP MEMBER APPLICATION SYSTEM AND METHOD

TECHNICAL FIELD

The present invention relates to a system and a method for applying a strip member, which can be suitably used for building a green tire. In particular, the present invention is intended to provide a technology capable of properly applying a ribbon-like strip of unvulcanized rubber onto the peripheral surface of a rotational member having a curved surface portion, while allowing an effective reduction in surface area of the occupation floor.

BACKGROUND ART

When a green tire is built, for example, by extruding a ribbon-like rubber strip from a mouthpiece in the extrusion head of an extruder, and winding and laminating the rubber strip onto the peripheral surface of a rotational member, it is preferred that the rubber strip is applied with a posture in parallel with a tangent to a contour line of the rotational member in its meridian section. Thus, there has been proposed an application system, for example, in Patent Documents 1 and 2 identified below, wherein the entirety of the system inclusive of the extruder can be swung within a plane including the center axis of a rotational member having a curved surface portion in its contour line within the meridian section, and can also be translated two-dimensionally, in directions perpendicular to each other in that plane.

More concretely, as schematically shown in a plan view in FIG. 4, Patent Documents 1 and 2 each discloses that the entirely of the application system D, inclusive of an extruder E for extruding a ribbon-like strip S of unvulcanized rubber, an application roller pair C for applying the rubber strip S onto the peripheral surface of the rotational member R, etc., can be swung along a planar contour line of the rotational member R, and also translated in the axial direction X of the rotational member R and another direction Y that is perpendicular to the axial direction X.

Patent Document 1: JP-2003-033,960A
Patent Document 2: JP-2003-334,867A

DISCLOSURE OF THE INVENTION (Task to be Solved by the Invention)

When, as in the above-mentioned proposal, the entirety of the application system D for the ribbon-like rubber strip S is designed such that it can be swung about the rotational member R, as shown in FIG. 4, it is necessary to secure a large floor area for allowing the swinging movement of the application system D inclusive of the extruder E. The surface area must be increased as the extruder E is designed to have a higher capacity. Moreover, a high power motor is required for causing swinging motion of the application system D as a whole, which results in a problem of increased energy consumption.

Moreover, according to the above-mentioned proposal, since the application system itself is translated two-dimensionally in a horizontal plane, in directions perpendicular to each other, a larger area is inevitably required thereby giving rise to the problem in terms of the installation space, beside that an increased driving power is required for the translation movement, which, too, results in a problem of large consumption energy.

The present invention has been conceived so as to eliminate these problems of the technology according to the earlier proposal. More specifically, it is an object of the present invention to provide system and method for applying a ribbon-like strip member of unvulcanized rubber, which has been formed by extrusion or roll forming process. The present invention is to ensure that the strip member is properly wound and laminated onto the peripheral surface of a rotational member carried by a rotating support with sufficiently downsized moving parts for the desired swinging movement and two-dimensional translation so as to significantly reduce the occupation space and driving power as compared to the previously proposed technology. The present invention is also to ensure that the risk of deformation of the ribbon-like strip member is avoided, which would be likely to occur due to the downsized moving parts for the swinging movement.

(Means for Solving the Task)

According to one aspect of the present invention, there is provided an application system for an extruded, or rolled formed, ribbon-like unvulcanized rubber strip, which usually comprises a rubber strip having a predetermined cross-sectional shape and a predetermined dimension, wherein the rubber strip is fed through a clearance between application rollers forming a pair and applied onto a peripheral surface of a rotational member having a curved surface portion, i.e., a rotational member having a meridian-sectional contour line with a curved surface portion, e.g., directly onto the peripheral surface of a rotational support or onto the peripheral surface of a rubber material, reinforcing cord material or the like, which has been previously applied to the rotational support. The system according to the present invention comprises: a guide roller for guiding the rubber strip before it reaches the application roller pair, wherein the guide roller is wound by the rubber strip and defines a vertical detour path, e.g., a substantially U-shaped path extending either upwards or downwards; and first and second auxiliary rollers arranged, respectively, on a downstream side and an upstream side of the guide roller adjacent thereto, for defining a leading end and trailing end of the detour path of the rubber strip. The application roller pair is adapted to be swung in a horizontal plane about a pivot that is spaced from the guide roller toward the first auxiliary roller or the second auxiliary roller.

Here, the term "rotational member" is used to refer to a rotational support as a core for winding thereon a ribbon-shaped rubber strip upon building of a green tire, such as a green tire case shaped by a shaping bladder or the like during a general tire building process, or a rigid core having a substantially toroidal outer shape corresponding to an inner shape of a product tire, and also to an assembly in which at least one kind of tire constitutive member has been previously applied onto such a rotational support.

Also, the term "extruded ribbon-like rubber strip" refers to a rubber strip formed by a mouthpiece of an extrusion head in an extruder, whether or not it is equipped with a displacement-type pump such as a gear pump, while the term "roll-formed ribbon-like rubber strip" refers to a rubber strip formed by a roll, e.g., a calendar roll or the like.

In the system according to the present invention, it is preferred that the application roller pair is adapted to be swung together with the guide roller and the second auxiliary roller, about the pivot that is spaced from the guide roller toward the first auxiliary roller. It is also preferred that the application roller pair has the pivot of swinging movement, which is situated on a vertical line that is tangent to an axial center point of the guide roller, i.e., the axial center point on the surface of the guide roller, on a side of the first auxiliary roller.

Thus, in connection with the position of the pivot, when reference is made of an expression "spaced" from the guide roller toward the first auxiliary roller or second auxiliary roller, it is intended to encompass not only a case wherein the pivot is spaced from the surface of the guide roller toward the first or second auxiliary roller, but also case wherein the pivot is situated on a vertical line that is tangent to the surface of the guide roller.

It is also preferred that at least the second auxiliary roller is connected to a rotary drive means, so as to allow rotation of the rollers with the respectively desired peripheral speeds.

It is also preferred that at least the guide roller and the first auxiliary roller are provided, respectively, with positional restraining means for limiting a movement of the rubber strip in its width direction, which mat be comprised of concave curved surface portion, convex curved surface portion, grooves, flanges, etc.

In the system according to the present invention, the final cross-sectional shape and the final dimension of the rubber strip can be determined either when the application roller pair is designed to function also as roll-forming roller pair, or when a roller die for rolling the rubber strip is provided on a downstream side of the second auxiliary roller.

According to another aspect of the present invention, there is provided an application method for a ribbon-like rubber strip, which has been formed by extrusion or roll forming, wherein the rubber strip is fed through a clearance between application rollers of a pair while being rolled or without being rolled, and applied by the application roller pair onto a peripheral surface of a rotational member having a curved surface portion. The method comprises: winding the rubber strip around a guide roller, and feeding the rubber strip to the application roller pair through the above-mentioned vertical detour path; and causing a swinging movement of the application roller pair in a horizontal plane, about a pivot spaced from the guide roller on its side opposite to the rotational member, or on its side of the rotational member, such that the rubber strip is applied onto the peripheral surface of at least the curved surface portion of the rotational member during its rotation.

It is preferred to cause a unitary swinging movement of the application roller pair and the guide roller about the pivot, which is spaced from the guide roller on its side opposite to the rotational member. It is also preferred to cause a twisting deformation of a vertically extending portion of the rubber strip, which is closest to said pivot, and of which the vertical extension length has been suitably selected, about a widthwise center line of the rubber strip, and within a range in which plastic deformation of the rubber strip does not occur.

It is further preferred that the rubber strip is applied while moving the rotational member two-dimensionally in a horizontal plane including the center axis of the rotational member.

(Effects of the Invention)

With the application system according to the present invention, the application roller pair is arranged, for example, between the extruder and the rotational member such that they can be swung together with the guide roller and the second auxiliary roller, under a suitable selected swinging arm length. Thus, the ribbon-like rubber strip can be properly applied onto the rotational member having a curved surface portion in its peripheral surface, preferably under a posture in parallel with the tangent to the meridian-sectional contour line of the rotational member, in a manner exactly as intended, without causing deformation, undulation or the like of the rubber strip.

In this way, according to the present invention, the rubber strip can be properly applied by causing a swinging movement of the application roller pair, the guide roller and the second auxiliary roller while leaving the extruder stationary. Thus, as compared to the technology according to the previous proposal, in which the entirety of the application system inclusive of the extruder undergoes a swinging movement, it is possible to sufficiently reduce the swinging floor area, significantly enhance the space utilization efficiency, and markedly reduce the consumption energy required for the swinging movement.

When the application roller pair is caused to swing in a horizontal plane, as exemplarily shown in FIGS. 5(a) and 5(b), there may be instances wherein the rubber strip S of predetermined width and thickness, which has been formed by, and extruded from the mouthpiece in the extrusion head HD of the extruder E, is applied directly and locally with an external bending force in its width direction, due to the swinging movement of the pair of the application rollers C. This may cause a problem that the rubber strip in its unvulcanized state undergoes a bending deformation in the application direction of the external force, or undulation between the application rollers of a pair, thereby making it difficult to properly apply the rubber sheet onto the peripheral surface of the rotational member. In other words, it is considered that the above-mentioned undulation is caused when the rubber strip is forcibly bent and a shrinkage restoration force is generated in the rubber strip on the outer side of its bending deformation, so that the shrinkage restoration force tends to cause a deformation of the rubber strip in the direction opposite to the above-mentioned bending deformation.

Therefore, in the application system according to the present invention, at a position between the extruder and the application roller pair, the rubber strip is wound about the guide roller so as to form, for example, a substantially U-shaped detour path along which the rubber strip extends vertically over a required length.

By this, when the rubber strip is wound and laminated as intended while the application roller pair on the trailing end side of the detour path is caused to swing in a horizontal plane together with the guided roller and the second auxiliary roller, the rubber strip is subjected to a twisting deformation in its vertically extending portion between the guide roller and the first auxiliary roller on the leading end side of the detour path about its widthwise center line. The twisting deformation is dispersed over substantially the entire length of the vertically extending portion of the rubber strip. Thus, by suitably selecting the length of the vertically extending portion of the rubber strip in association with the swinging angle range of the application roller pair, etc., it is possible to sufficiently prevent occurrence of deformation in the rubber strip, effectively prevent occurrence of undulation of the rubber strip, and ensure that the rubber strip is always applied to the rotational member in a proper manner.

In this instance, when the application roller pair is adapted to be swung together with the guide roller and the second auxiliary roller, about a pivot that is spaced from the guide roller toward the first auxiliary roller, as compared with the case wherein the pivot is situated on the opposite side, it is possible to advance the rubber strip into the clearance between the application rollers of a pair along a straight path, thereby effectively preventing deformation or undulation of the rubber strip at the application roller pair. In other words, if the swinging pivot were spaced from the guide roller toward the second auxiliary roller, the twisting of the rubber strip generated between the guide roller and the second auxiliary roller would not be sufficiently dispersed or absorbed to that the rubber strip tends to undergo deformation or undulation at the application roller pair.

However, there may be instances wherein the swinging angle required for the application roller pair is relatively small in association with the curved surface portion of the rotational member, and a sufficient length of the detour path formed by the guide roller for the rubber strip can be preserved, so that the swinging pivot may be spaced from the guide roller toward the second auxiliary roller. Even in such instances, it is possible to effectively prevent deformation or undulation of the rubber strip, thereby allowing the rubber strip to be wound and laminated on the rotational member while realizing a further downsizing of the movable parts and further reduction of the occupation space for such movement.

In the application system according to the present invention, it is preferred that the swinging pivot of the application roller pair, etc., is situated on a vertical line that is tangent to an axial center point on the peripheral surface of the guide roller on a side of the first auxiliary roller, as mentioned above. It is particularly effective that this vertical line also passes that axial center point on the peripheral surface of the first auxiliary roller on a side of the guide roller, so that the extension path of the rubber strip between the first auxiliary roller and the guide roller coincides with that vertical line. In this instance, it is possible to positively afford a predetermined swinging posture of the rubber strip, and even more effectively prevent undulation of the rubber strip, as compared to the case where the swinging pivot is spaced further toward the first auxiliary roller.

When the relative two-dimensional movement between the application system and the rotational member within a horizontal plane is achieved by the movement of the rotational member, it is possible to apply the rubber strip onto the desired position of the rotational member as expected, beside that the occupation space and consumption energy for such two-dimensional movement can be effectively reduced, as compared to the above-mentioned earlier proposal.

The application system according to the present invention may be used, for example, to wind an unvulcanized rubber strip, which has been formed by the mouthpiece in the extrusion head of an extruder, successively around the first auxiliary roller, guide roller and second auxiliary roller, and subject the rubber strip to rolling by the application roller pair to have desired shape and dimension. On such occasion, there may be a risk of elongation or rupture of the rubber strip due to tension applied to the rubber strip before it reaches the application roller pair, due to the running resistance applied by the rollers to the rubber strip, or due to insufficient dispersion or absorption of the twisting deformation of the rubber strip along the detour path. In order to effectively avoid such a risk, it is preferred that at least the second auxiliary roller in addition to the application roller pair is driven by a rotary drive means, so as to suppress the elongation of the rubber strip between the mouthpiece or the like to the second auxiliary roller as far as possible.

Such a measure is effective whether or not the rubber strip is subjected to rolling by the application roller pair, and particularly effective if the first auxiliary roller and the guide roller are also driven for rotation such that their peripheral speeds are controlled to a constant value.

Furthermore, in the application system according to the present invention, when the guide roller is swung together with the second auxiliary roller and the application roller pair, the rubber strip may be applied with an external force causing a twisting deformation of the rubber strip between the guide roller and the first auxiliary roller. On such occasion, the rubber strip may be moved on these rollers in the direction opposite to the twisting direction, so as to maintain a steady running state. Such movement of the rubber strip may result in its undulation or disengagement from the rollers. Thus, in order to avoid such a risk, it is preferred that at least both of these rollers, and more preferably the rollers including the second auxiliary roller, on which the rubber strip is wound, are provided, respectively, with positional restraining means for limiting a movement of the rubber strip in its width direction, which may be in the form of a convex curved surface portion, a concave curved surface portion, grooves, flanges or the like.

The eventual cross-sectional shape and dimension of the rubber strip to be wound and laminated onto the rotational member may be determined either by using the application roller pair as the rolling roller pair, or by using a roller die arranged on the downstream side of the first auxiliary roller.

In the application method according to the present invention, the application roller pair together with the guide roller are caused to swing about a pivot situated, for example, on that side of the guide roller which is remote from the rotational member, so that the rubber strip is wound onto the peripheral surface of the rotational member under while it is being rotated, along with necessary change of the advancing direction of the rubber strip depending upon the twisting deformation thereof. It is thus possible to reduce the space and energy, and effectively prevent undesired deformation or undulation of the rubber strip by feeding the rubber strip to the application roller pair through the vertical detour path, as discussed above with reference to the application system. Such advantages can also be achieved under the above-mentioned particular conditions, when the application roller pair is caused to swing about a pivot that is spaced from the guide roller toward the rotational member.

Here, upon the swinging movement of the application roller pair, when the vertical extension of the rubber strip situated closest to the swinging pivot undergoes a twisting deformation about its widthwise center line, such twisting deformation can be sufficiently dispersed to the entirety of the vertical extension of the rubber strip so as to prevent undesired local deformation and avoid the risk of plastic deformation of the rubber strip or its undulation.

In the application method according to the present invention, when the rubber strip is applied while causing a two-dimensional translation movement of the rotational member in two directions perpendicular to each other, it is possible to achieve the above-mentioned functional advantages in terms of the occupation space and consumption energy.

BRIEF DESCRIPTION OF THE DRAWINGS

FIGS. 5(a) and 5(b) are schematic views showing occurrence of a plastic deformation or the like in the rubber strip due to the swinging movement of the application roller pair.

Figure 1:
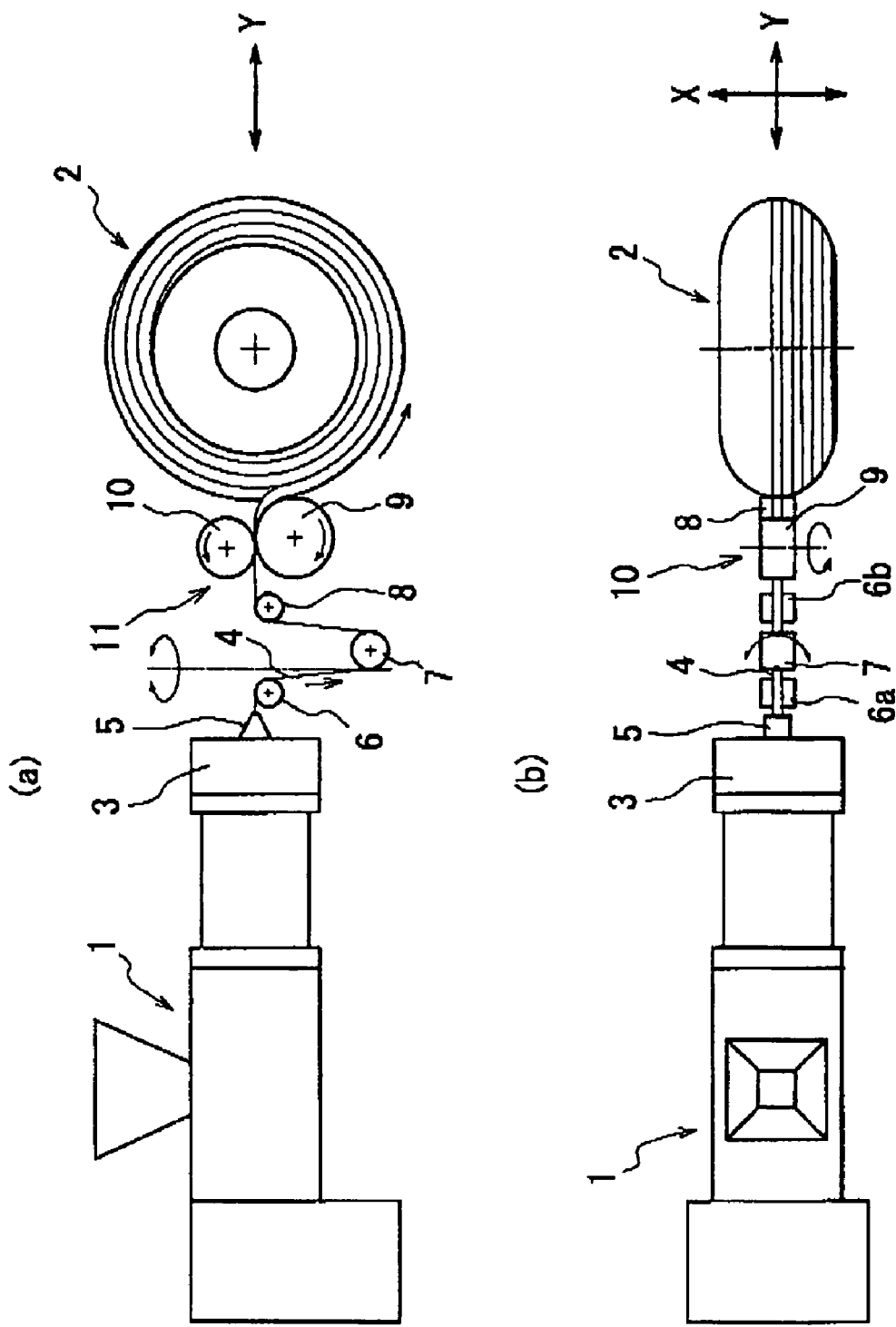
FIGS. 1(a) and 1(b) are schematic side view and plan view, respectively, showing one embodiment of the system according to the present invention.

| (Listing of Reference Numerals) | |
|---|---|
| 1 | extruder |
| 2 | rotational member |
| 3 | extrusion head |
| 4 | ribbon-like rubber strip |
| 5 | mouthpiece |
| 6 | first auxiliary roller |
| 7 | guide roller |
| 8 | second auxiliary roller |
| 9, 10 | application rollers |
| 11 | application roller pair |
| 12 | positional restraining means |
| 13 | roller die |

BEST MODE FOR CARRYING OUT THE INVENTION

FIGS. 1(a) and 1(b) are schematic side view and plan view, respectively, showing an embodiment of the application system according to the present invention together with an extruder. Reference numeral 1 denotes the extruder which includes a gear pump as a displacement-type pump, and reference numeral 2 denotes a rotational member. The rotational member 2 may be comprised of a substantially toroidal rigid core having an outer shape that corresponds to the inner shape of a product tire. The rotational member 2 has an outer diameter that is suitable determined according to the tire size.

In the illustrated embodiment, the extruder 1 includes an extrusion head 3, to which is secured a mouthpiece 5 for extruding and molding a ribbon-like strip 4 of unvulcanized rubber. A first auxiliary roller 6 is arranged on the downstream side of the mouthpiece 5. The first auxiliary roller 6 is freely rotatable or adapted to be driven into rotation, and serves to smoothly change the running direction of the rubber strip 4. A guide roller 7 is arranged on the downstream side of the first auxiliary roller 6, as being spaced therefrom by 250 mm, for example. The guide roller 7, too, is freely rotatable or adapted to be driven into rotation.

In the illustrated embodiment, furthermore, a second auxiliary roller 8 and an application roller pair 11 are successively arranged on the downstream side of the guide roller 7. The second auxiliary roller 8 I situated on the same level as the first auxiliary roller 6. The application roller pair 11 comprises two rollers, i.e., a large-diameter roller 9 and a small-diameter roller 10. The application roller pair 11 has an inter-roller level which is same as the level of the mouthpiece 5. The rollers of the application roller pair can be driven into rotation in mutually opposite directions. A clearance is formed between the rollers for the required shaping of the rubber strip 4. The rubber strip can be passed through the clearance and is thereby rolled into predetermined shape and dimension, and then urged onto the peripheral surface of the rotational member 2 under a required force by means of the large-diameter roller 9.

Thus, it is necessary to connect the rollers 9, 10 of the application roller pair 11 to a rotary drive means. It is preferred to connect at least the second auxiliary roller 8, and more preferably other rollers 6, 7 also, to the rotary drive means, so as to control the peripheral speed of the relevant rollers and thereby effectively eliminate the risk of undesired elongation or rupture of the rubber strip 4.

As shown in the drawings, the application roller pair 11 is adapted to swing, together with the guide roller 7 and the second auxiliary roller 8, about a pivot that is spaced from the guide roller 6 toward the first auxiliary roller 6, within a horizontal plane and over a desired angular range. It is preferred that the pivot is situated, as shown in the schematic plan view of FIG. 2 with enlarged scale, on a vertical line that is tangent to an axial center point of the guide roller 7 on the side close to the first auxiliary roller 6. In the illustrated embodiment, it is further preferred that the edge of the first auxiliary roller 6 on its downstream side is situated immediately above the edge of the guide roller 7 on its upstream side, and the edge of the second auxiliary roller 8 on its upstream side is situated immediately above the edge of the guide roller 7 on its downstream side.

With such an arrangement, it is possible to achieve downsizing of the movable parts, effectively reduce the occupation space required for the swinging movement, and advantageously suppress the deformation amount of the rubber strip under a proper selection of the position of the pivot. Incidentally, when an extruder having a size of 120 mmϕ is used, the present invention makes it possible to reduce the swinging radius to 0.3 m, whereas a radius of 1.0 m is required when the swinging movement of the rotational member is to be permitted, and a radius of 2.5 m is required when the swinging movement of the extruder is to be permitted.

According to the present invention, the swinging movement of the application roller pair 11, etc., can be readily achieved by providing a frame member (not shown) for directly supporting the respective rollers 7, 8, 9, 10 and mount the frame member on a base member such that the frame member can be rotated within a horizontal plane relative to the base member under the operation of a motor or the like. In this instance, the swinging movement of the application roller pair 11, etc., can be performed either continuously, or intermittently upon each turn of rotation of the rotational member 2 as a unit.

Figure 2:
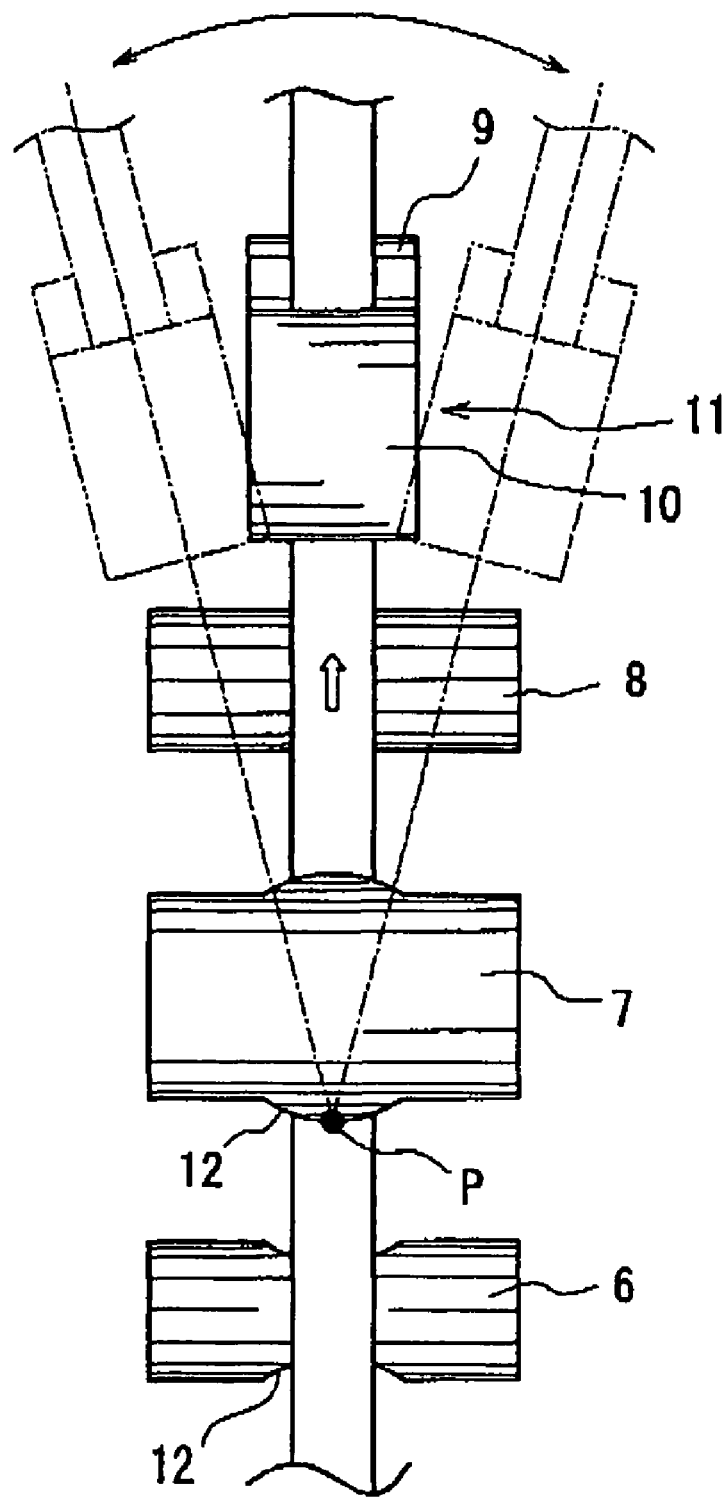
FIG. 2 is a schematic plan view, in enlarged scale, exemplarily showing the mode of swinging movement of the application roller pair.

When the running direction of the rubber strip 4 changes upon swinging movement of the application roller pair 11, etc., it would be desirable to restrain the movement of the rubber strip 4 in its width direction, i.e., in the axial direction of the rollers so as to eliminate the risk of plastic deformation of the rubber strip 4, its undulation or disengagement from the rollers. To this end, it is preferred that at least the guide roller 7 and the first auxiliary roller 6 are provided with a positional restraining means 12 in the form of a concave surface portion, a convex surface portion, or the like, as shown in FIG. 2.

In the application system according to the present invention constructed as above, a ribbon-shaped strip of unvulcanized rubber, which has been molded by the mouthpiece 5 secured to the extruder 1, is successively passed over the first auxiliary roller 7, the guide roller 7 and the second auxiliary roller 8, so as to form a substantially U-shaped detour path that is convex downwards. The rubber strip 4 is then fed to the application roller pair 11 preferably by rotationally driving the rollers 6, 7, 8 at the predetermined speeds. Simultaneously, the application roller pair 11 is caused to swing in the horizontal plane integrally with the guide roller 7 and the second auxiliary roller 8. By this, the rubber strip rolled by the application roller pair 11 into the predetermined dimension is applied onto the peripheral surface of the rotational member 2 from the direction of normal to the outer contour line of the rotational member 2 in its meridian-section, mainly under the operation of the large-diameter roller 9, and the rubber strip is thus properly wound and laminated on the rotational member 2 as intended.

The deformation of the rubber strip 4 as a result of the swinging movement of the application roller pair 11 is widely, and preferably sufficiently uniformly dispersed to the region between the guide roller 7 and the first auxiliary roller 6 along the detour path. It is thus possible to effectively prevent plastic deformation of the rubber strip 4 or its undulation, in conjunction with the operation of the positional restraining means 12.

Here, when the above-mentioned application of the rubber strip is performed while two-dimensionally moving the rotational member 2 in a horizontal plane in directions X and Y as shown in FIGS. 1(*a*) and 1(*b*), the occupation space and the consumption energy can be further reduced more effectively.

In the foregoing, the present invention has been described with reference to the embodiment shown in FIGS. 1(*a*), 1(*b*) and 2. However, it is also possible to form a detour path for the rubber strip into a substantially inverted U-shape so as to be convex upwards.

Figure 3:
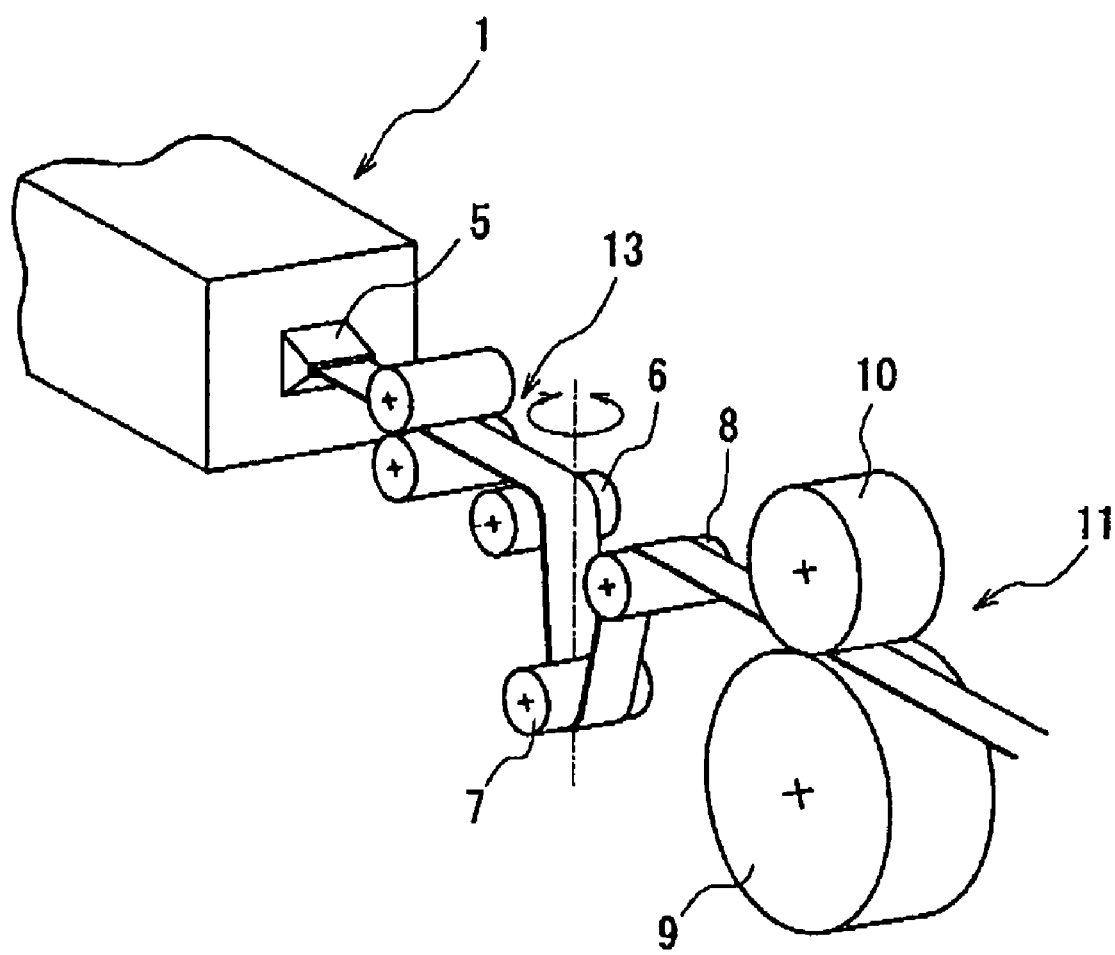
FIG. 3 is a schematic perspective view showing another embodiment of the present invention.
Figure 4:
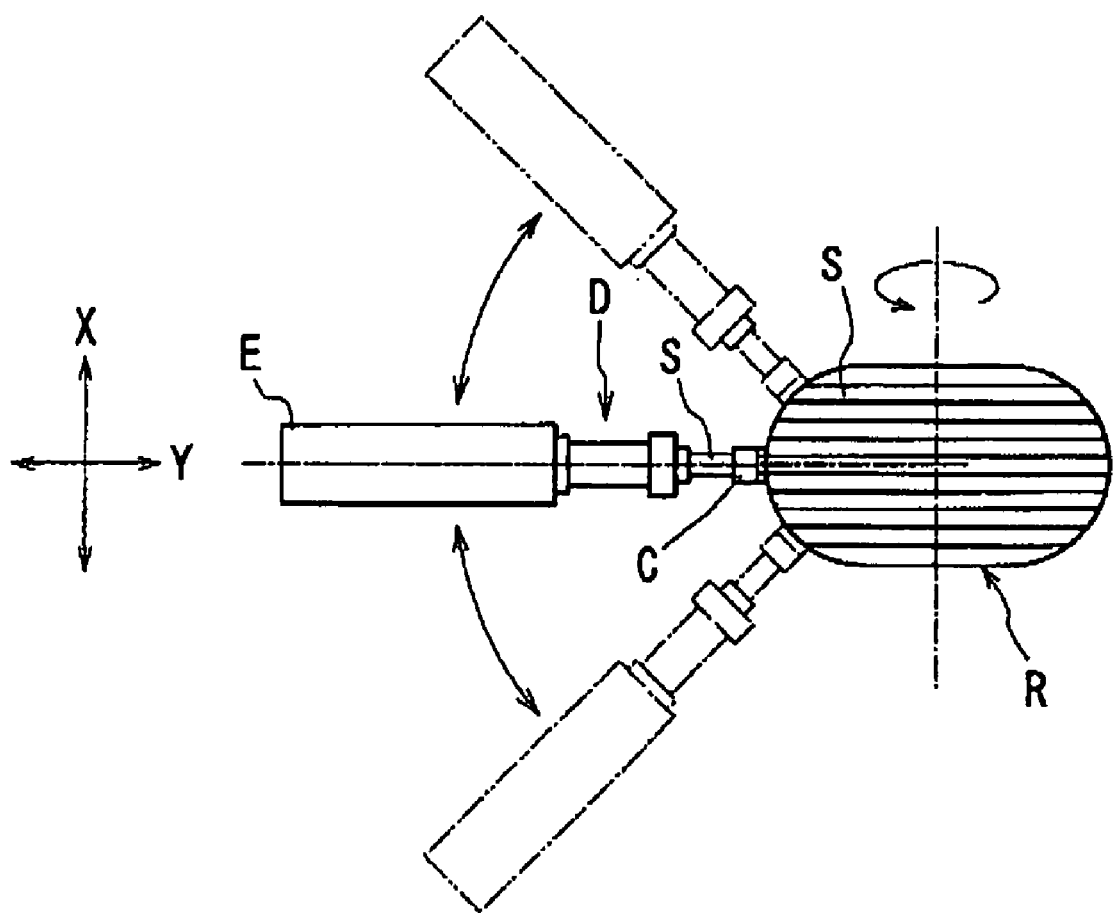
FIG. 4 is a schematic plan view showing a prior art system.

FIG. 3 is a schematic perspective view showing the major elements in the application system according to another embodiment of the present invention. In this embodiment, a roller die 13 is arranged between the mouthpiece 5 of the extruder 1 and the first auxiliary roller 5. The roller die 13 serves to roll the rubber strip 4, which has been molded by the mouthpiece 5, into predetermined shape and dimension. Thus, the application roller pair 11 only serves to apply onto the rotational member 2 the rubber strip 4 that has already been rolled. The remaining structure of this embodiment is essentially the same as in the previous embodiment.

The application system of such a structure also provides essentially the same functional advantages as the previous embodiment, by causing a swinging movement of the application roller pair 11 within a horizontal plane, together with the guide roller 7 and the second auxiliary roller 8.

In the application system according to the illustrated embodiments, it is assumed that the rubber strip 4 is molded by a mouthpiece 5 provided for the extruder 1. It is alternatively possible to form the rubber strip by using a calendar roll or other suitable roll.

In the application system shown in FIGS. 1(a), 1(b), 2 and 3, the application roller pair 11 is swung about a pivot that is spaced from the guide roller 7 toward the first auxiliary roller 6. According to the present invention, however, the pivot may be spaced from the guide roller 7 toward the second auxiliary roller 8.

Working Examples

Rubber strips were would and laminated onto a rotational member using the application system of the structure shown in FIG. 1, under the conditions shown in Table 1 below. The cutting of the rubber strips, application positions and the lamination qualities were tested. The results of the tests are shown in Table 2.

TABLE 1

|  | Mouthpiece dimension (mm$^2$) | Extrusion speed (m/min) | Swinging elements (±30°) | 2nd auxiliary roller surface speed (m/min) | Application roller surface speed (m/min) |
|---|---|---|---|---|---|
| Control | 30 × 2.5 | 50 | application rollers 11 | 0 | 120 |
| Ex. 1 | 30 × 2.5 | 50 | application rollers 11, guide roller 7 and 2nd auxiliary roller 8 | 0 | 120 |
| Ex. 2 | 30 × 2.5 | 50 | application rollers 11, guide roller 7 and 2nd auxiliary roller 8 | 55 | 120 |
| Ex. 3 | 30 × 2.5 | 50 | application rollers 11 and 2nd auxiliary roller (8) | 55 | 120 |

TABLE 2

|  | Undulation at application rollers (mm) | Deviation of application position on rotational member (mm) | Number of rubber strip cutting times (times/20 times) | Rubber strip width deviation (mm) | Rubber strip lamination quality (5-step evaluation) |
|---|---|---|---|---|---|
| Control | ±5.0 | ±7.0 | 5 | 2.0 | 1 |
| Ex. 1 | ±1.0 | ±1.5 | 2 | 1.0 | 3 |
| Ex. 2 | ±0.5 | ±0.8 | 0 | 0.5 | 5 |
| Ex. 3 | ±2.0 | ±2.0 | 0 | 1.0 | 3 |

It can be seen from Table 2 above that the working example 2 (ex. 2) in which the second auxiliary roller is driven for rotation was effective for preventing cutting of the rubber strip and effectively preventing undulation, positional deviation and fluctuation in width of the rubber strip to provide a particularly excellent winding and laminating effects, and that the working examples 1 and 3 (ex. 1 and ex. 3) also provide an excellent lamination quality as compared to the control system wherein the swinging movement is performed only with respect to the application roller pair.

The invention claimed:

1. An application system for a ribbon-like rubber strip, which has been formed by extrusion or roll forming, wherein the rubber strip is fed through a clearance between application rollers forming a pair, and applied onto a peripheral surface of a rotational member having a curved surface portion, said system comprising:
   the rotational member having the curved surface portion;
   a guide roller for guiding the rubber strip before it reaches the application roller pair, said guide roller being wound by the rubber strip and defining a vertical detour path; and
   first and second auxiliary rollers separate from the guide roller arranged, respectively, on an upstream side and a downstream side of said guide roller adjacent thereto;
   said application roller pair being adapted to be swung in a horizontal plane about a pivot that is spaced from said guide roller toward said first auxiliary roller,
   wherein the application roller pair and the guide roller are configured to swing unitarily about the pivot.

2. The application system for a rubber strip according to claim 1, wherein said application roller pair is adapted to be swung together with said guide roller and said second auxiliary roller, about said pivot that is spaced from said guide roller toward said first auxiliary roller.

3. The application system for a rubber strip according to claim 1, wherein said application roller pair has said pivot of swinging movement, which is situated on a vertical line that is tangent to an axial center point of the guide roller on a side of said first auxiliary roller.

4. The application system for a rubber strip according to claim 1, wherein at least said second auxiliary roller is connected to a rotary drive means.

5. The application system for a rubber strip according to claim 1, wherein at least said guide roller and said first auxiliary roller are provided, respectively, with positional restraining means for limiting a movement of the rubber strip in its width direction.

6. The application system for a rubber strip according to claim 1, further comprising a roller die for rolling said rubber strip, on a downstream side of said second auxiliary roller.

7. An application method for a ribbon-like rubber strip, which has been formed by extrusion or roll forming, wherein the rubber strip is fed through a clearance between application rollers forming a pair and applied by the application roller pair onto a peripheral surface of a rotational member having a curved surface portion, said method comprising:
   winding the rubber strip around a guide roller, and feeding the rubber strip to the application roller pair through a vertical detour path;
   winding the rubber strip around first and second auxiliary rollers separate from the guide roller arranged, respectively, on an upstream side and a downstream side of said guide roller adjacent thereto;

causing a swinging movement of the application roller pair in a horizontal plane, about a pivot spaced from the guide roller on its side opposite to the rotational member, so that the rubber strip is applied onto the peripheral surface of the rotational member during its rotation; and causing a unitary swinging movement of the application roller pair and the guide roller about the pivot, which is spaced from the guide roller on its side opposite to the rotational member.

8. The application method according to claim 7, further comprising:

causing a twisting deformation of a vertically extending portion of the rubber strip, which is closest to said pivot, about a widthwise center line of the rubber strip.

9. The application method according to claim 7, wherein said rubber strip is applied while moving the rotational member two-dimensionally in a horizontal plane including the center axis of the rotational member.

* * * * *